US009122034B2

(12) United States Patent
Coffey et al.

(10) Patent No.: US 9,122,034 B2
(45) Date of Patent: Sep. 1, 2015

(54) CABLE SLACK STORAGE FOR WALL OUTLET

(71) Applicant: ADC TELECOMMUNICATIONS, INC., Berwyn, PA (US)

(72) Inventors: Joseph C. Coffey, Burnsville, MN (US); Cyle D. Petersen, Belle Plaine, MN (US); Gordon P. Clark, Eden Prairie, MN (US); Loren J. Mattson, Richfield, MN (US)

(73) Assignee: ADC Telecommunications, Inc., Berwyn, PA (US)

( * ) Notice: Subject to any disclaimer, the term of this patent is extended or adjusted under 35 U.S.C. 154(b) by 0 days.

(21) Appl. No.: 13/724,547

(22) Filed: Dec. 21, 2012

(65) Prior Publication Data

US 2013/0163943 A1 Jun. 27, 2013

Related U.S. Application Data

(60) Provisional application No. 61/579,892, filed on Dec. 23, 2011.

(51) Int. Cl.
*G02B 6/00* (2006.01)
*G02B 6/44* (2006.01)
*G02B 6/38* (2006.01)
*H02G 3/12* (2006.01)
*H02G 11/00* (2006.01)

(52) U.S. Cl.
CPC ............ *G02B 6/4441* (2013.01); *G02B 6/4466* (2013.01); *G02B 6/3897* (2013.01); *G02B 6/4452* (2013.01); *G02B 6/4453* (2013.01); *G02B 6/4454* (2013.01); *G02B 6/4455* (2013.01); *H02G 3/121* (2013.01); *H02G 11/00* (2013.01)

(58) Field of Classification Search
CPC ............... G02B 6/4452–6/4455; G02B 6/3897
USPC .......................................... 385/135; 361/826
See application file for complete search history.

(56) References Cited

U.S. PATENT DOCUMENTS

| 5,631,993 | A * | 5/1997 | Cloud et al. ................... 385/135 |
| 6,571,047 | B1 * | 5/2003 | Yarkosky et al. ............. 385/135 |
| 2005/0103515 | A1 * | 5/2005 | Fuller et al. ..................... 174/50 |

* cited by examiner

*Primary Examiner* — Jerry Blevins
(74) *Attorney, Agent, or Firm* — Merchant & Gould P.C.

(57) ABSTRACT

A cable storage system includes a box and at least one cable retainer. The box includes a plurality of walls at least partially defining a box interior. The box receives a cable from an exterior of the box. At least one wall of the box defines a retainer opening. The retainer is adapted to receive an unsecured length of the cable and may be selectively secured to the retainer opening. When the retainer is secured to the retainer opening, the retainer extends out of the interior of the box. Multiple retainers may be used to store additional lengths of cable.

12 Claims, 12 Drawing Sheets

CABLE SLACK STORAGE FOR WALL OUTLET

CROSS-REFERENCE TO RELATED APPLICATIONS

This application claims priority to U.S. Provisional Application No. 61/579,892, filed Dec. 23, 2011, and titled "Cable Slack Storage for Wall Outlet," the disclosure of which is hereby incorporated herein by reference.

BACKGROUND

Various types of cables are used in building trades, information technology systems, or other applications to provide necessary or desired service to locations within a building or other structure. These cables may include fiber optic cables, coaxial cables, phone cables, electrical power cables, etc. At the point of service, free ends of the cable are typically connected to a terminal or outlet, allowing an end user to selectively connect equipment to the available service. Building codes and best practices often require a length of cable slack to be available at each terminal to increase ease of connection to the terminal or equipment. The terminal or equipment may be located at a building wall or may be located outside of the wall, but in either case additional cable slack is often desirable. Regardless of the final point of connection, however, cable slack is best contained to avoid damage to the cable and/or prevent unsightly or hazardous conditions. To prevent damage to the cable, care should be taken when storing the cable slack. Too often, however, cable slack is simply forced into a wall box or a wall space itself.

SUMMARY

In one aspect, the technology relates to a cable storage system including: a box having a plurality of walls at least partially defining a box interior, the box adapted to receive a cable from an exterior of the box, wherein a first wall defines a first retainer opening; and a first retainer adapted to receive a first unsecured length of the cable, wherein the first retainer is selectively secured to the first retainer opening, and wherein when secured to the first retainer opening, the first retainer extends out of the interior of the box. In one preferred embodiment, the cables stored with the noted system are fiber optic cables.

In another aspect, the technology relates to a method for securing a cable at a box, wherein the cable has a free end, the method including: inserting a first unsecured length of the cable into a first retainer; and selectively securing the first retainer to a first opening defined by a first wall of the box.

BRIEF DESCRIPTION OF THE DRAWINGS

There are shown in the drawings, embodiments which are presently preferred, it being understood, however, that the technology is not limited to the precise arrangements and instrumentalities shown.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

FIGS. 1-4 depict various views of a cable storage system 100. The system 100 includes a box 102 that includes a plurality of side walls 104 and a back wall 106. Any of these walls 104, 106 may define one or more openings 108 for receiving a length of cable from a building service. A knockout or punch may be included on each opening, to be removed during installation. A bracket 110 may be connected to one or more of the walls 104 and may define one or more fastener openings 112 to allow connection of the bracket 110 to a building construction element, such as a wall stud. In an alternative embodiment, one or more movable ears, such as those utilized with so-called "old-work" or "renovation" electrical boxes, may be utilized to secure the box 102 directly to a wall panel. In such an embodiment, the ears are tightened to the wall panel as a screw on the box is rotated, until the box is tight to the wall panel.

Figure 9:
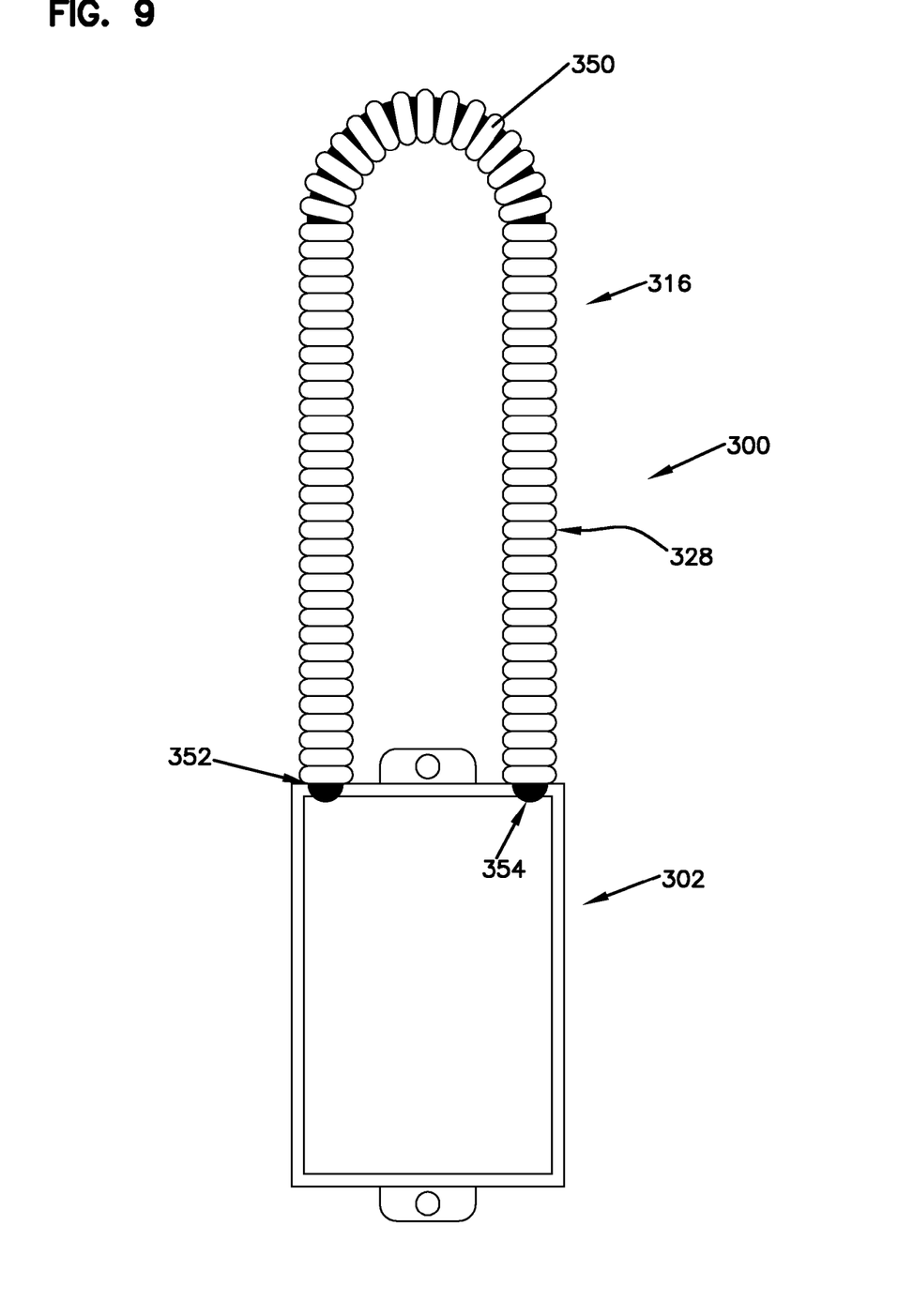
FIG. 9 is a front view of a cable storage system.

One or more walls 104 define a retainer opening 114 for receipt of a retainer 116. The retainer 116 may be any desirable shape, but a U-shaped retainer, such as the type depicted, are particularly desirable, since they allow for easy storage of a length of cable slack, while maintaining sufficient curvature in the stored cable to reduce the possibility of kinks and other damage to the cable. Fiber cables, copper cables, hybrid cables, or other cables may be used. The depicted U-shaped retainer 116 includes a curved portion 118 and two flexible arms 120. The retainer 116 forms a storage implement for the length of cable slack. In that regard, the retainer 116 may be substantially channel-shaped, as depicted, or may form a closed or substantially closed tube or pipe. One embodiment of a closed retainer is depicted in FIG. 9, below. With regard to the retainer 116 depicted in FIGS. 1-4, the channel comprises a base element 122 and two wall elements 124 extending therefrom. The base 122 and the walls 124 of the channel assist in holding the length of cable slack in position once the retainer 116 is installed in the box 102. However, one or more projections 126 extending from one wall 124 towards another wall 124 may also be utilized to increase cable retention ability of the retainer 116.

The retainer 116 may be selectively secured to the box 102 at the retainer opening 114. The retainer 116 includes a textured surface 128 that engages with the edges of the retainer opening 114 to selectively secure the retainer 116 at a desired depth, relative to the box 102. In the depicted embodiment, the textured surface 128 includes a plurality of projections 130. Each projection 130 includes an angled ramp surface 132 that allows the retainer 116 to be inserted through the retainer opening 114 in a ratchet-like operation. As each retainer 116 is inserted into its associated opening 114, the flexible arms 120 deflect as the ramp surface 132 contacts the edge of the opening 114, allowing the retainer 116 to be selectively secured at an appropriate or desired depth. Shoulder surfaces 134 prevent the retainer 116 from falling back through the opening 114. When removal or partial removal of the retainer 116 is desired, the ends of the flexible arms 120 may be squeezed together to disengage shoulder surfaces 134 from the edges of the retainer opening 114. The retainer 116 may then be removed or repositioned. A maximum position of the retainer 116 may be dictated by one or more stops 136 located proximate the ends of the arms 120. These stops 136 are configured and/or sized to prevent further movement of the retainer 116 once contact with the wall 104 is made. In certain embodiments, the textured surface may include a slip resistant material or coating to prevent the retainer from inadvertently sliding from the retainer opening. This material or coating may be used in conjunction with or instead of the projections 130.

Figure 5:
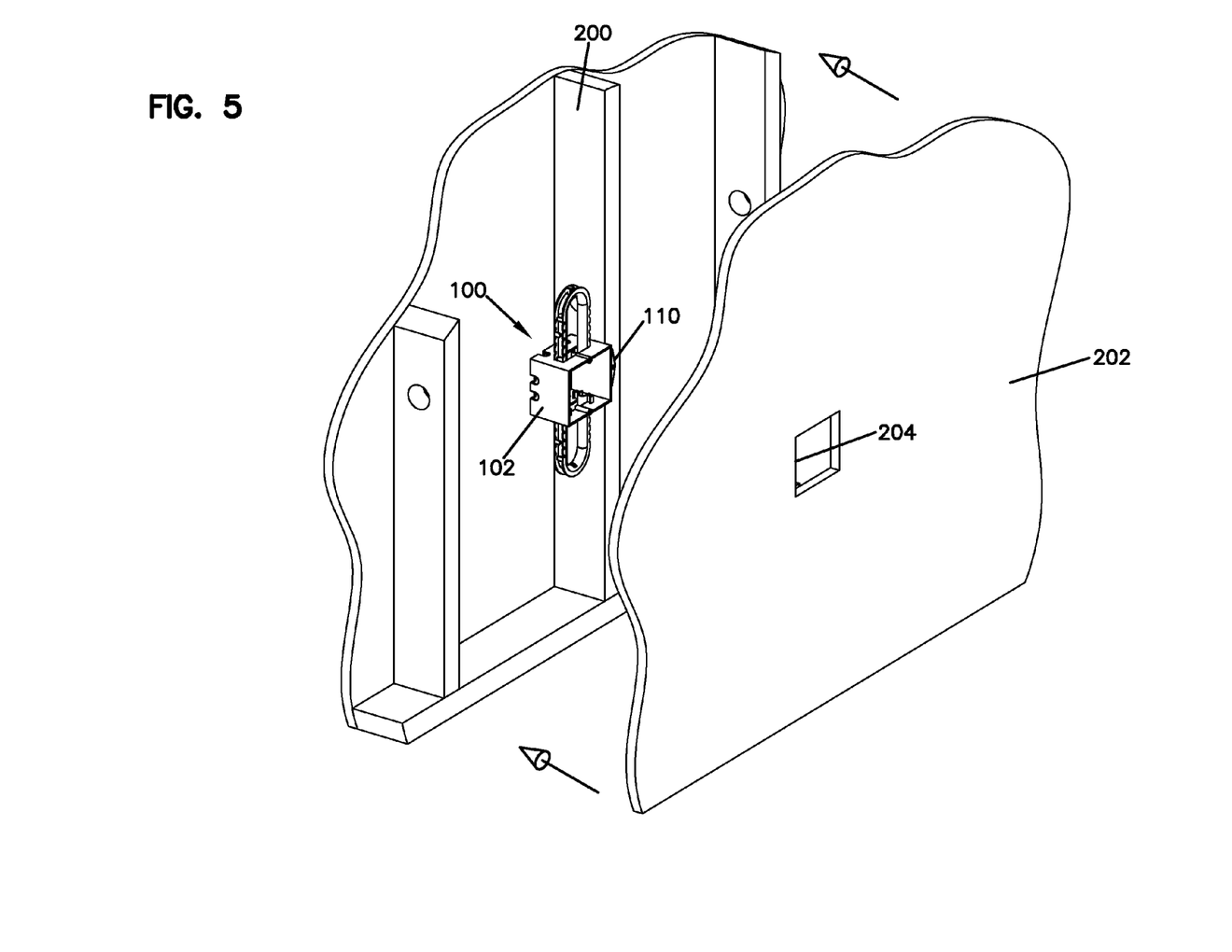
FIG. 5 is a front perspective view of the cable storage system of FIG. 1 connected to a building construction element.
Figure 6:
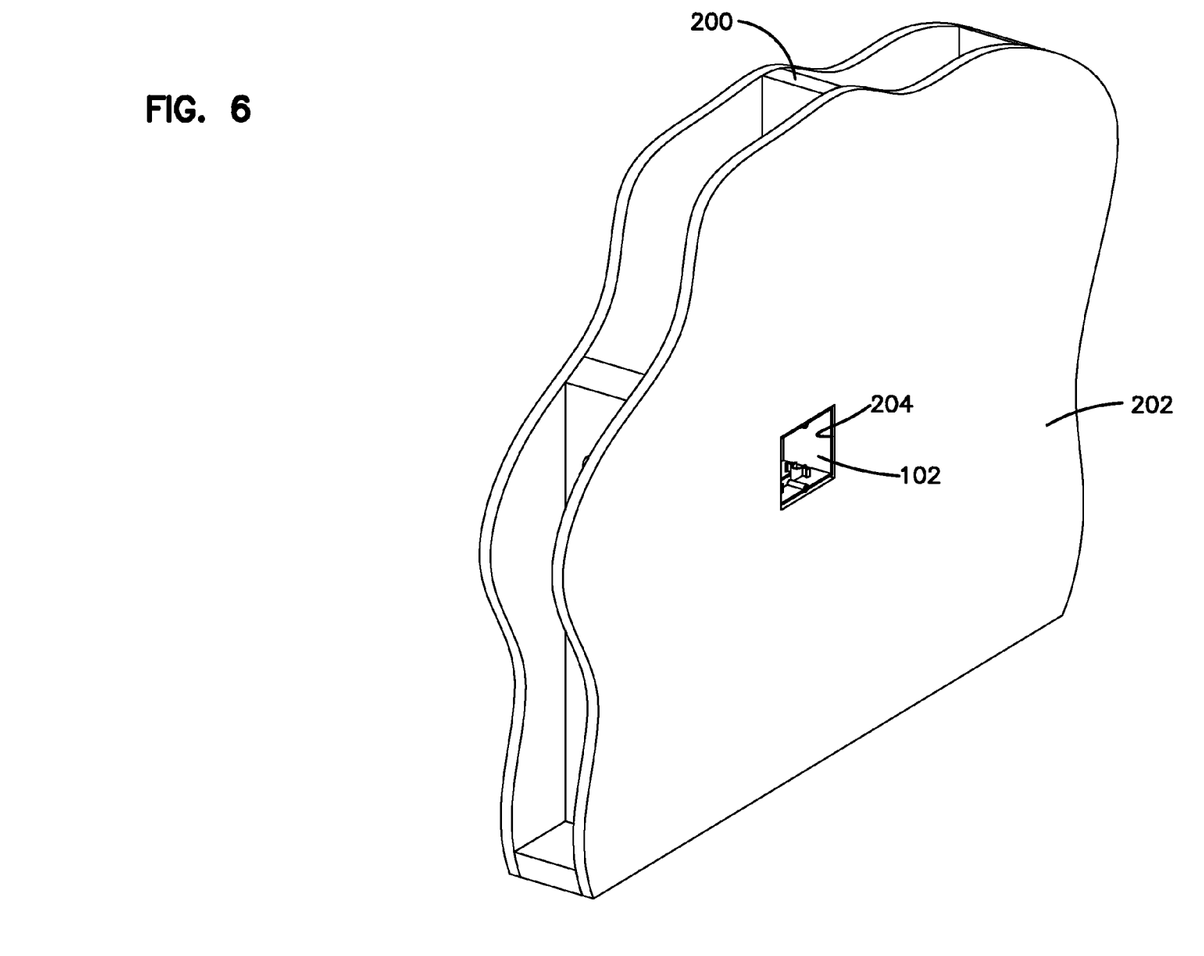
FIG. 6 is a front perspective view of the cable storage system of FIG. 1 installed in a wall.
Figure 7:
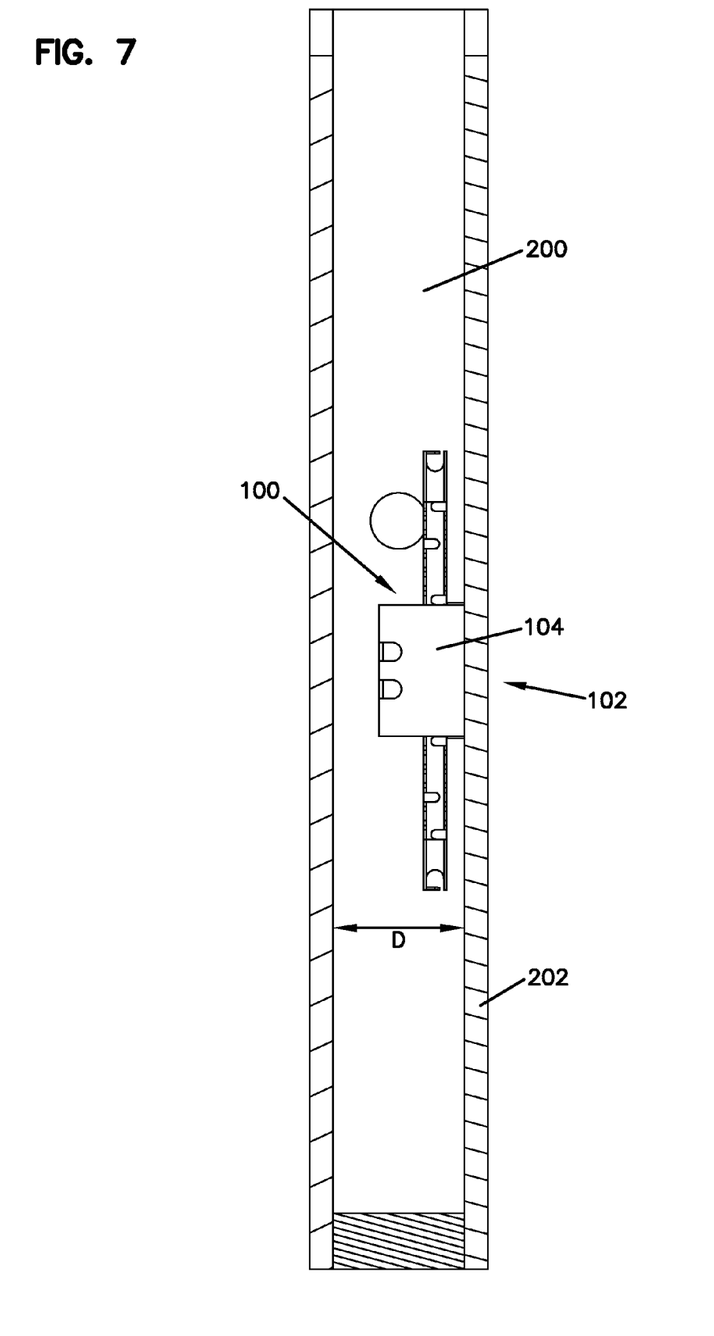
FIG. 7 is a side view of the cable storage system of FIG. 1 installed in a wall.
Figure 8:
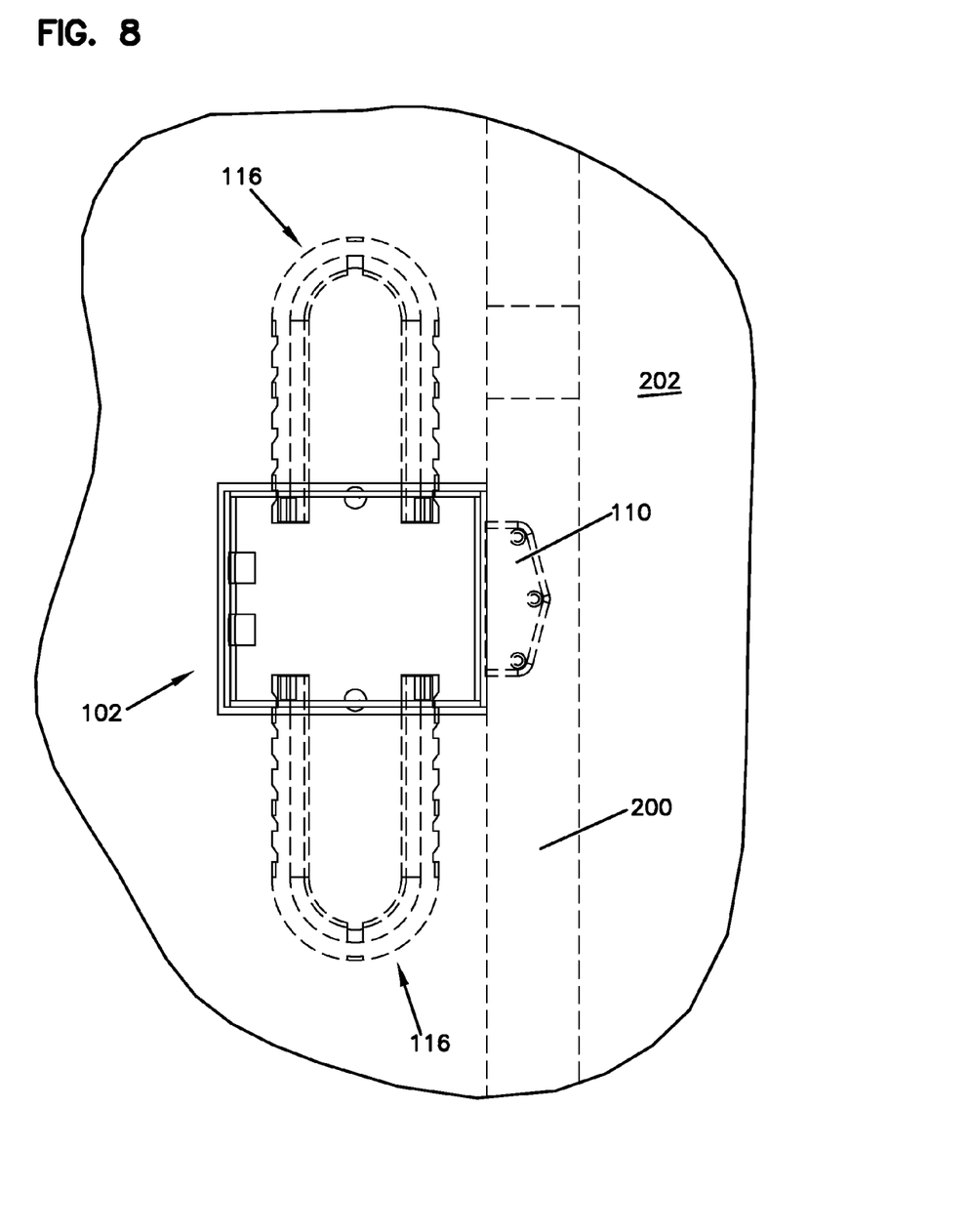
FIG. 8 is a front view of the cable storage system of FIG. 1 installed in a wall.

FIGS. 5-8 depict the cable storage system 100 of FIG. 1 installed in a wall. The cable storage system 100 may be secured to a building construction element, such as a stud 200, by the bracket 110, as depicted. Thereafter, a wall panel 202 (for example, sheetrock) defining an opening 204 sized similar to the box 102 may be secured to the studs 200, using known techniques. FIG. 6 depicts the wall panel 202 installed, with the opening 204 providing access to the interior of the box 102. Wall panel 202 can also be installed prior to installation of the box 102. FIG. 7 is a sectional view of a wall having the cable storage system 100 installed therein. The depth of the box 102 (specifically the depth of the walls 104) may be similar to that of a standard electrical box, thus enabling insertion of the cable storage system 100 in a wall space having a standard depth D. Of course, boxes having so-called "shallow" depths, as typically understood in the construction industry, are also contemplated. FIG. 8 depicts the cable storage system 100 installed behind a wall panel 202. Elements hidden behind the wall panel 202 are shown in phantom. Typically, the cable retainers 116 are secured to the box 102 when the bracket 110 is secured to the stud 200, as depicted in FIG. 5. For retrofit installations where the wall panel 202 is already secured to the studs 200, however, the box 102 may first be inserted through the opening 204 and fixed to the wall panel 202 with the ears, as described above. Thereafter, the retainers 116 may be installed through the retainer openings, via the front opening of the box 102.

FIG. 9 depicts an alternative embodiment of a cable storage device 300. This embodiment includes a box 302, in this case, dimensioned similar to a standard North American duplex box. The retainer 316 in this embodiment is a closed tube 350 that may be secured, detachably or fixedly, to the box 302 at a first end 352. The second end 354 of the tube 350 may be similarly secured to the box 302. In this embodiment, a free end of cable slack may be fed into the tube 350 for storage of the cable. Similar to the other embodiments described herein, multiple retainers may be used although only one is depicted. A textured surface 328 may also be utilized to selectively secure the retainer 316 to the box 302 at a desired depth within a retainer opening.

Figure 10:
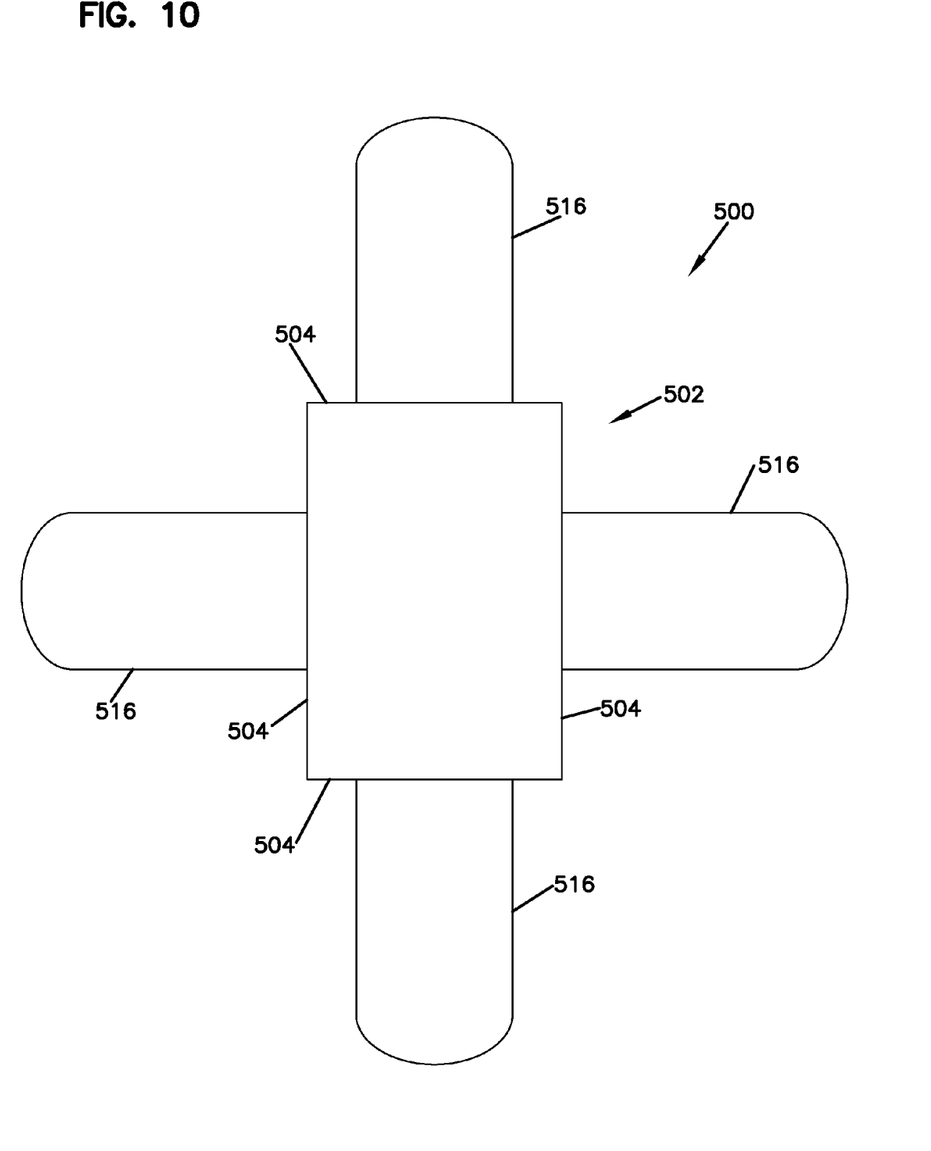
FIG. 10 is a front view of a cable storage system.

For cables such as fiber optic cables that include a termination connector that is larger than the cable itself, the cable must first be fed through the retainer 316, prior to installation of the connector. Of course, larger diameter retainers may be used to accommodate the connectors, but this is not required. When it is desired to have more cable available for installation of a termination connector or to connect the cable to equipment, the first end 352 of the retainer 316 may be released and the cable pulled out of the wall. Once the work that required access to the cable is complete, the retainer 316 may be reconnected to the box 302. FIG. 10 depicts another embodiment of a cable storage system 500 that includes a box 502. A retainer 516 extends from each of the four walls 504. Retainers 516 can also extend from the back wall if desired and if there is room for the retainer.

Figure 1:
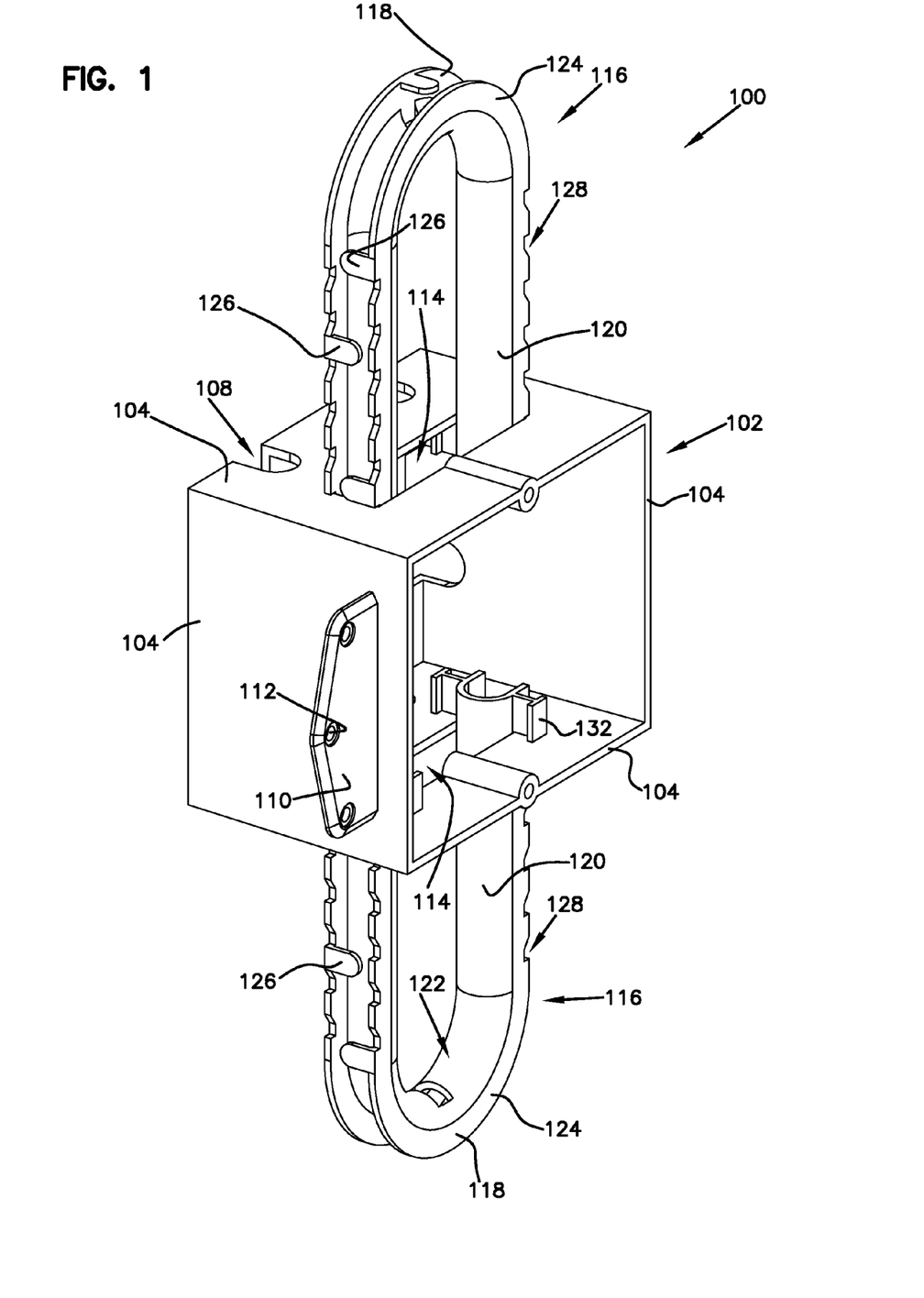
FIG. 1 is a front perspective view of a cable storage system.
Figure 2:
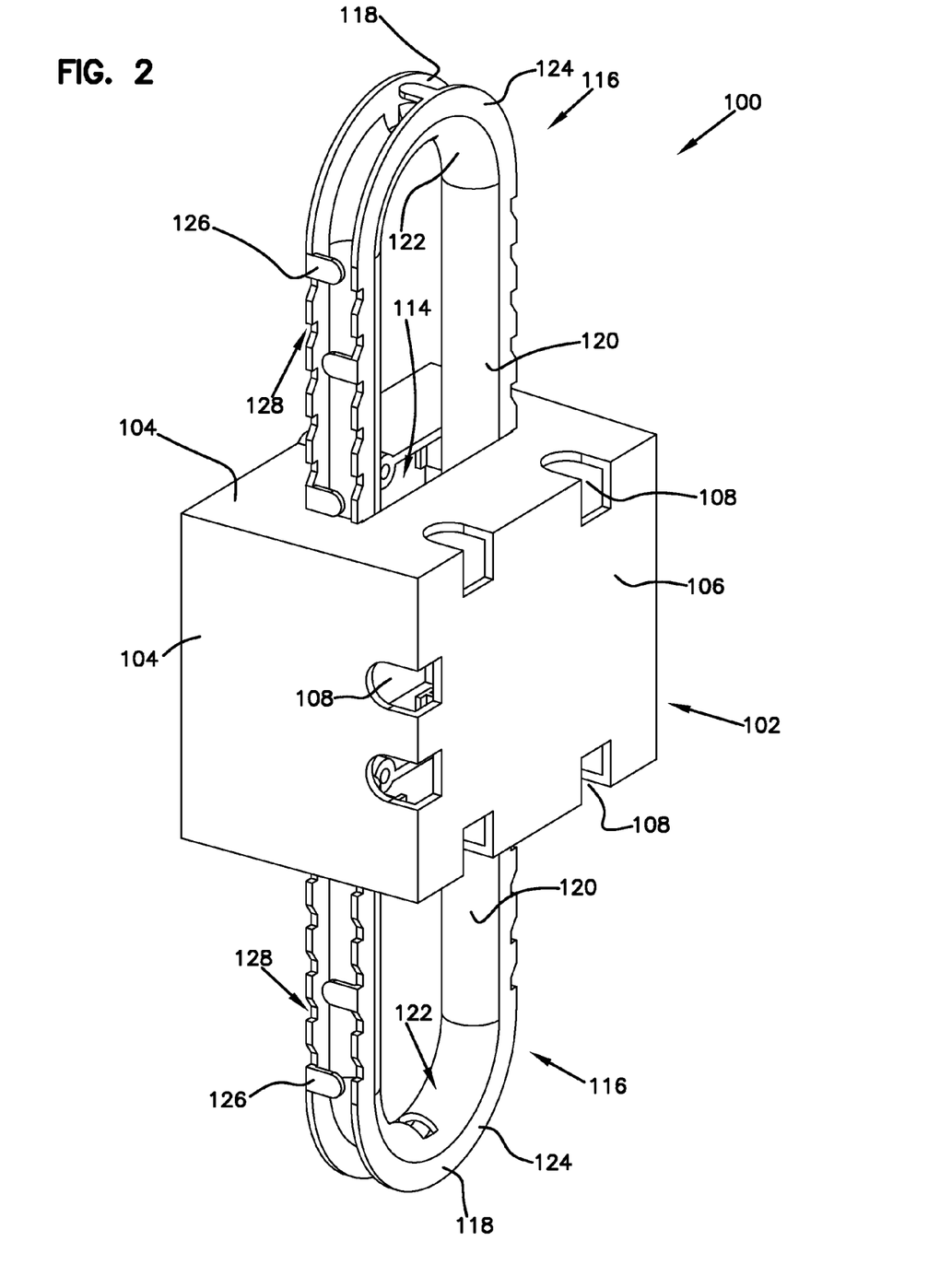
FIG. 2 is a rear perspective view of the cable storage system of FIG. 1.
Figure 3:
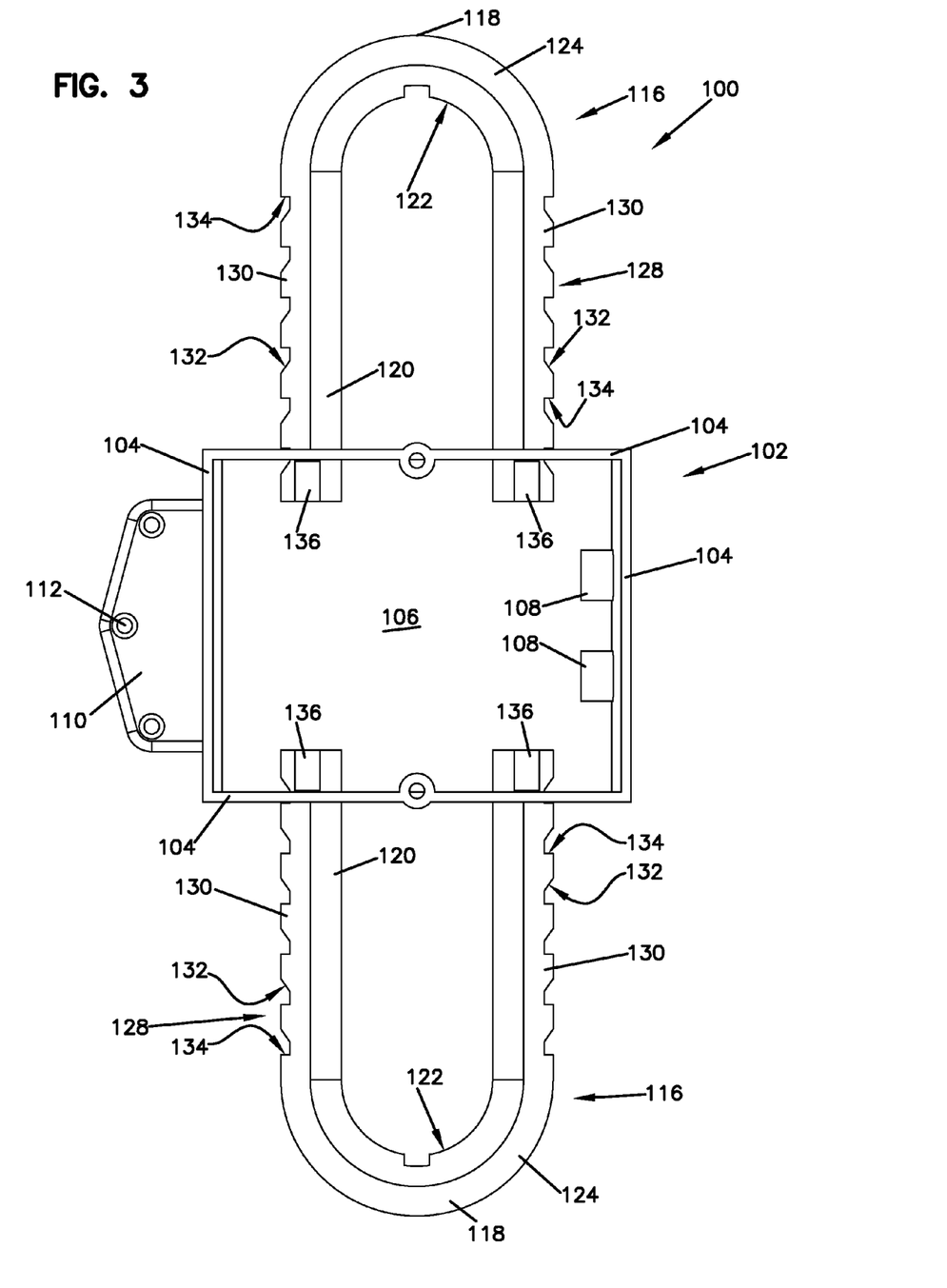
FIG. 3 is a front view of the cable storage system of FIG. 1.
Figure 3A:
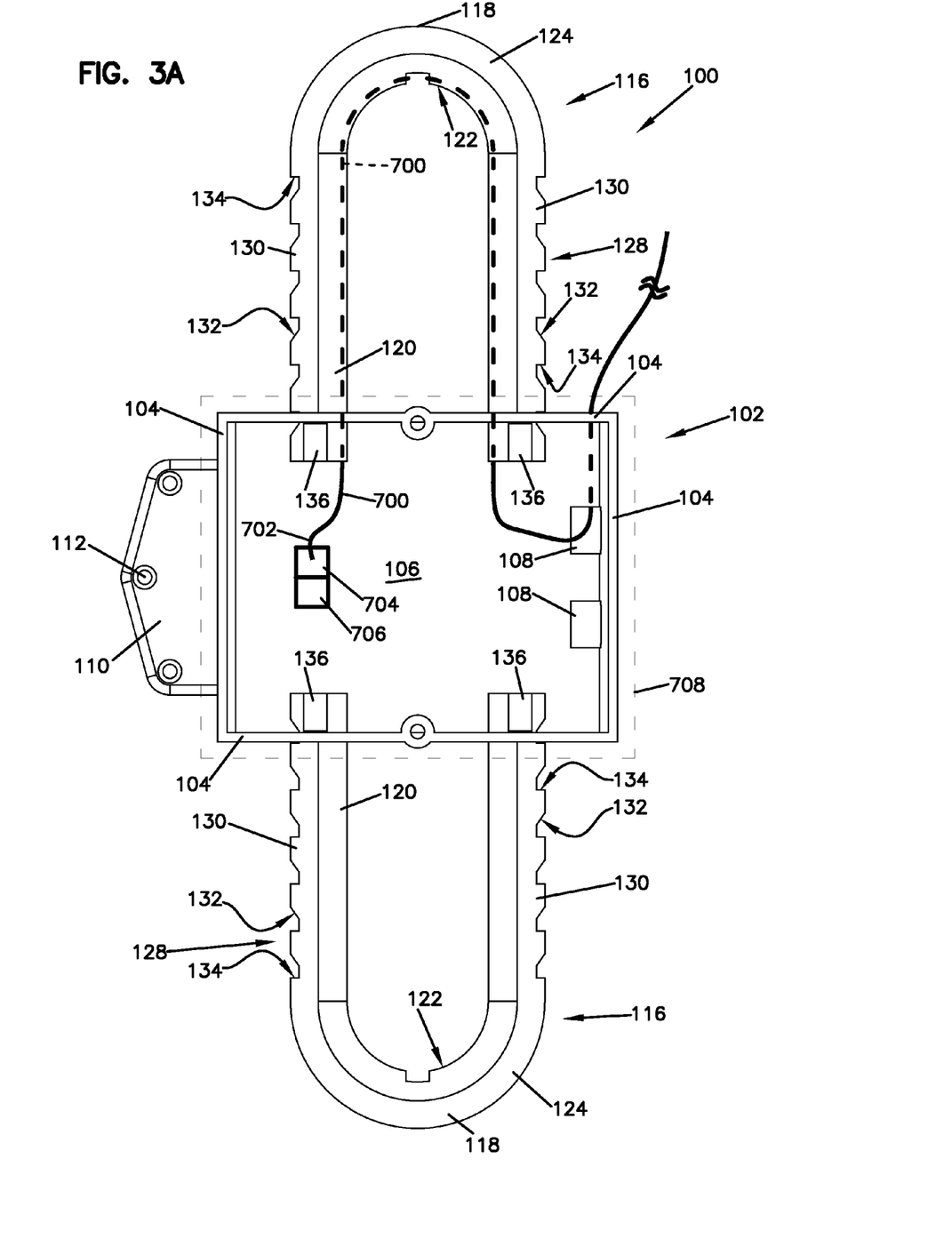
FIG. 3A shows an example cable stored in the cable storage system of FIG. 1.
Figure 4:
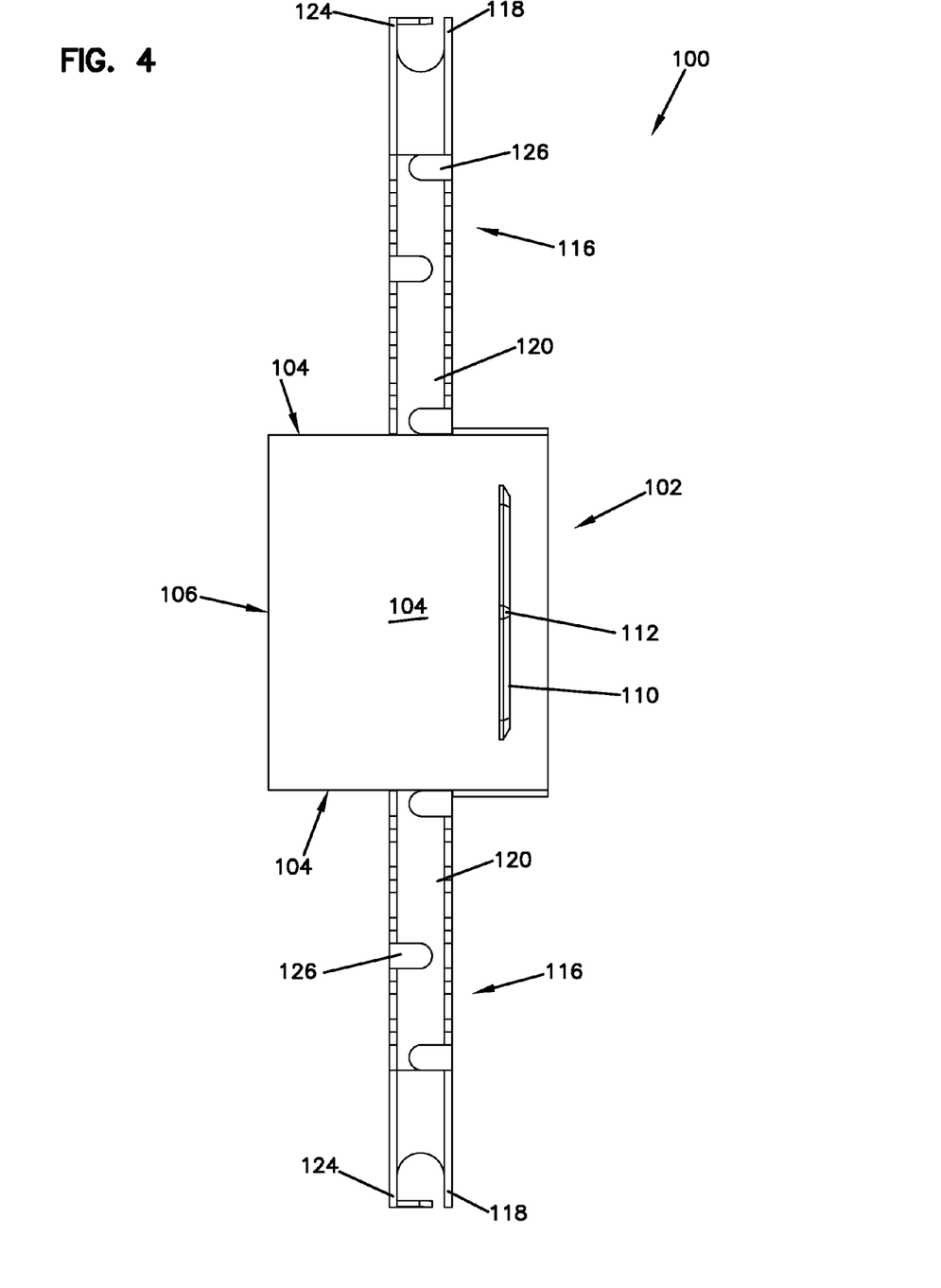
FIG. 4 is a side view of the cable storage system of FIG. 1.
Figure 11:
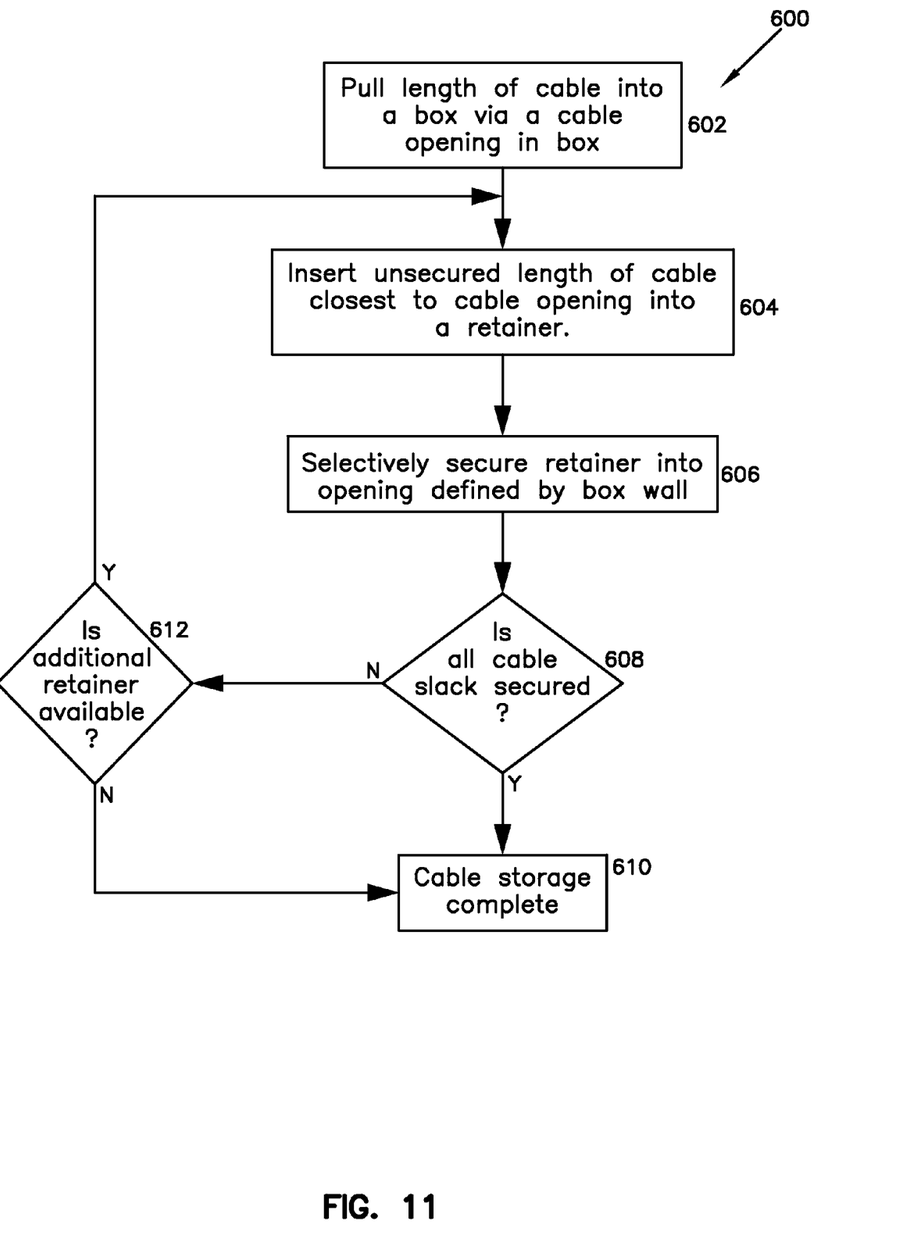
FIG. 11 depicts a method of storing cable in a cable storage system.

The cable storage systems described herein allow cable slack to be available during termination and installation procedures, while still allowing for storage of excess lengths of cable neatly within a wall space. FIG. 11 depicts a method 600 of securing or storing a length of cable at a cable storage device or box, such as the one depicted in FIG. 1. This method 600 may also be used to store cable within an "old work" box, described above, once that box is installed in a wall. A length of cable slack 700 is first pulled into the box via a cable opening 108, as depicted in FIGS. 2 and 3A (Step 602). In general, any amount of cable may be pulled into the box, but typically all slack is pulled, until essentially all cable slack within the wall space is removed. Depending on the required cable installation, the free cable end may be terminated with an appropriate connector, connected to equipment, etc. Alternatively, the cable slack may be stored as described below, and connected to equipment, terminated, etc., at a later time. The portion of cable slack closest to the cable opening is then inserted into a retainer (Step 604). Thereafter, the retainer is inserted into a retainer opening in the box and selectively secured to the box, using the textured surface described above (Step 606). Insertion of the retainer (and cable carried therein) into the retainer opening positions both elements exterior to the box, within the wall space. Thereafter, if all cable slack has been secured (Step 608), the cable storage is complete (Step 610). Returning to Step 608, if all cable slack has not been secured, and if an additional retainer is available (Step 612), Steps 604 and 606 may be repeated. Again, the portion of unsecured cable closest to the cable opening should be secured, in order to properly secure the cable slack. Once all cable slack is secured (Step 608) or once all available retainers have been used (Step 612), the cable storage is complete (Step 610). To unwind, remove, or otherwise unsecure the cable, the retainer last secured in the retainer opening is first released and the cable removed therefrom. This process may continue until an appropriate amount of cable has been freed from storage. The work requiring access to a length of cable slack, e.g., connection to equipment, termination at a connector, replacement of a damaged connector, etc., may then be performed. Thereafter, the remaining length of cable slack may be stored again as described above.

The cable storage system described herein may include any number of retainers, which may project from any of the side walls of the box. In general, each wall is configured to receive one retainer, though the number of retainers per side wall is limited only be the depth of side wall itself. That is, deeper side walls may accommodate more than one retainer. Additionally, retainers may be inserted into retainer openings located in the rear wall of the box. These embodiments, however, have obvious practical limitations due to the depth of the wall, but in certain applications, they may be useful. The boxes may be any size typically used for single or multi-gang switches or outlets, or custom sizes may be fabricated, depending on the particular application. Additionally, multiple cables or types of cables may be stored within discrete retainers within the cable storage system. For example, electrical power cable may be stored in a first retainer, telephone cable may be stored in a second retainer, coaxial cable in a third retainer, and so on. Sizes of the retainers may also vary from shallow to deep, allowing for storage of different lengths of cable slack. Wider retainers may be used to store multiple lengths (i.e., loops) of cable slack. In certain embodiments, a box may be manufactured with punch outs on all sides of the box. Retainers may be obtained separately and the entire system may be field-configurable (punch-outs removed and retainers inserted) based on the working conditions.

In one example implementation of system 100, cable end 702 is terminated to a fiber connector 704 which is connected to a fiber adapter 706 of a face plate 708. Adapter 706 receives an external fiber connector on the exterior of face plate 708. Other implementations are possible.

Although the cable storage systems described herein have been depicted installed behind wall panels, surface-mounted installations may also be utilized if, for example, the storage system is installed in an unfinished room or other space. The cable storage systems described herein may also be utilized to store cable that is typically exposed (e.g., television or computer equipment power cables). In such an embodiment, the box may be modified such that it may be directly secured to an existing power outlet. Power cables may then be held within the secured retainers and the free plugs inserted into available outlets. Although cables used primarily for electrical currents and or signals have been described herein, the described cable storage systems and concepts related thereto would also have application in pneumatic systems used for HVAC control systems, where kinks in the pneumatic tubing are undesirable.

The materials used for the boxes and retainers described herein may be the same as those typically used for electrical boxes used in the construction industry. These may include injection molded plastics and metals such as zinc and steel. Additionally, corrosion resistant metals such as stainless steel may be used if the system is to be used in environments where such resistance to corrosion is required or desired. These environments may include outdoor applications, marine environments, etc.

While there have been described herein what are to be considered exemplary and preferred embodiments of the present technology, other modifications of the technology will become apparent to those skilled in the art from the teachings herein. The particular methods of manufacture and geometries disclosed herein are exemplary in nature and are not to be considered limiting. It is therefore desired to be secured in the appended claims all such modifications as fall within the spirit and scope of the technology. Accordingly, what is desired to be secured by Letters Patent is the technology as defined and differentiated in the following claims, and all equivalents.

What is claimed is:

1. A cable storage system comprising:
a box comprising a plurality of walls at least partially defining a box interior, the box adapted to receive a cable from an exterior of the box, wherein a first wall defines a first retainer opening; and
a first retainer adapted to receive a first unsecured length of the cable and configured to be secured to the first retainer opening to extend out of the interior of the box, the first retainer configured to be adjustably secured to the first retainer opening at a desired length,
wherein the first retainer comprises a substantially U-shaped element, the U-shaped element including:
a base for supporting the first unsecured length of cable;
a plurality of walls extending from the base;
at least one first projection extending from a first of the plurality of walls towards a second of the plurality of walls, the first projection adapted to hold the first unsecured length of cable within the U-shaped element; and
a plurality of arms, the arms being flexible and including a plurality of second projections, each second projection including a ramp surface and a shoulder surface for selectively securing the arms to the first retainer opening.

2. The cable storage system of claim 1, wherein a second wall of the plurality of walls defines a second retainer opening, and further comprising a second retainer adapted to receive a second unsecured length of the cable, wherein the second retainer is selectively secured to the second retainer opening.

3. The cable storage system of claim 1, wherein the plurality of arms each comprises a stop proximate an end of the arm, wherein each stop is configured to prevent movement of the first retainer out of the first retainer opening.

4. The cable storage system of claim 1, wherein the first retainer comprises a tube.

5. The cable storage system of claim 1, further comprising a fiber connector, a fiber adapter and a face plate.

6. A cable storage system comprising:
a box comprising a plurality of walls at least partially defining a box interior, the box adapted to receive a cable from an exterior of the box, wherein a first wall defines a first retainer opening;
a first retainer adapted to receive a first unsecured length of the cable and configured to be secured to the first retainer opening to extend out of the interior of the box, the first retainer configured to be adjustably secured to the first retainer opening at a desired length; and
a bracket fixed to at least one wall for securing the box to a building construction element.

7. A cable storage system comprising:
a box comprising a plurality of walls at least partially defining a box interior, the box adapted to receive a cable from an exterior of the box, wherein a first wall defines a first retainer opening;
a first retainer adapted to receive a first unsecured length of the cable and configured to be secured to the first retainer opening to extend out of the interior of the box, the first retainer configured to be adjustably secured to the first retainer opening at a desired length; and
means for securing the box to a building construction element.

8. A method for securing a cable at a box, wherein the cable comprises a free end, the method comprising:
inserting a first unsecured length of the cable into a first retainer to support the first unsecured length of the cable on a base of a substantially U-shaped element of the first retainer under at least one first projection, the at least one first projection extending from a first of a plurality of walls of the U-shaped element towards a second of the plurality of walls of the U-shaped element and configured to hold the first unsecured length of the cable; and
adjustably securing a plurality of flexible arms of the U-shaped element of the first retainer to a first opening at a desired depth by using a plurality of second projections of the U-shaped element, the first opening defined by a first wall of the box, and each second projection including a ramp surface and a shoulder surface for selectively securing the arms to the first retainer opening 9. The method of claim 8, further comprising:
inserting a second unsecured length of the cable into a second retainer; and
selectively securing the second retainer to a second opening defined by a second wall of the box.

10. The method of claim 8, further comprising pulling the cable into the box.

11. The method of claim 8, further comprising connecting the free end of the cable to a terminal.

12. The method of claim 8, further comprising terminating the cable to a fiber connector, connecting the fiber connector to a fiber adapter, and connecting the fiber adapter to a face plate.

\* \* \* \* \*